United States Patent Office 3,340,319
Patented Sept. 5, 1967

3,340,319
SELECTIVE POLYMERIZATION OF ISOBUTENE
Robert L. Banks, Bartlesville, Okla., assignor to Phillips Petroleum Company, a corporation of Delaware
No Drawing. Filed May 18, 1964, Ser. No. 368,354
7 Claims. (Cl. 260—677)

ABSTRACT OF THE DISCLOSURE

Isobutene is selectively polymerized in the presence of butene with a fluorided silica catalyst. This process is effective in separating isobutene from n-butenes.

This invention relates to a process for polymerizing isobutene. A specific aspect of the invention relates to the selective polymerization of isobutene in admixture with n-butenes.

This invention is based upon the discovery that a fluorided silica catalyst is effective in polymerizing isobutene and that this catalyst selectively polymerizes isobutene in admixture with or in the presence of n-butenes.

In certain cases it is necessary to remove isobutene from an n-butene stream. Such a step is required in the manufacture of butadiene via the naphtha cracking-dehydrogenation route. Such an isobutene removal has previously been carried out by a cold acid wash. Such a wash, however, is expensive and inconvenient and the present invention process is offered as an improvement over that less desirable technique.

A number of catalyst systems are known which will polymerize isobutene. However, these are relatively non-selective and will also polymerize n-butenes as well. For example, silica-alumina or nickel oxide promoted silica-alumina catalysts will polymerize both isobutylene and n-butenes to a substantial degree. Consequently, such a non-selective polymerization catalyst is not only unable to affect the separation desired but, in addition, results in the loss of the n-butenes product through polymerization and/or copolymerization.

Accordingly, it is an object of the invention to provide a novel process for polymerizing isobutene. Another object is to provide a process for selectively polymerizing isobutene in admixture with n-butene. A further object is to provide a process for separating isobutene from a feed stream containing isobutene in admixture with substantial proportions of n-butenes. Other objects of the invention will become apparent to one skilled in the art upon consideration of the accompanying disclosure.

A broad aspect of the invention comprises contacting isobutene with a fluorided silica catalyst under polymerizing conditions so as to form polymer thereof. Another aspect of the invention comprises contacting a mixed feed of isobutene and n-butenes under isobutene polymerizing conditions with a catalyst consisting essentially of fluoride silica so as to polymerize the isobutene while leaving the n-butene fraction of the feed substantially unreacted. The separation of the isobutene polymer is then readily effected by conventional methods such as fractionation or distillation. The resulting polymer is a substantially higher molecular weight liquid and permits relatively simple separation.

A fluorided silica catalyst has been found to be selective in polymerizing isobutene in preference to n-butenes. The silica component of the catalyst can be any conventional catalytic grade silica material. Some examples are: precipitated silica gel; microspheroidal silica; flame-hydrolyzed silica; silica aerogels; diatomaceous earth; and the like. These materials can range from fine powders to coarse granules as well as other shapes such as agglomerates, pellets, spheres, extrudates, and the like depending upon the type of contacting technique which utilizes the catalyst. Before use in the process the silica must be subjected to an activation step which is an exposure at elevated temperatures to air or other suitable inert gas. Activation for 0.5–20 hours at 800–1400° F. can be used.

The silica is fluorided by intimately contacting it with a fluorine containing material and then calcining the composite at a temperature in the range of about 400 to about 1200° F. for a period of about 0.1 to about 20 hours. The fluoride containing material can be associated with the silica by any conventional and convenient way. Techniques such as impregnation or dry mixing can be used.

The fluoride treatment leaves a residue of fluorine on the catalyst in a manner and form which is not completely understood. The extent of the fluoriding treatment, therefore, will be such as to leave a fluorine residue in the range of about 0.1 to about 20 weight percent based on the support. Applicable fluoriding agents are hydrogen fluoride, ammonium fluoride, ammonium acid fluoride, ammonium silicofluoride, fluosilicic acid, as well as other materials which liberate hydrogen fluoride upon exposure to high temperatures. A fluoriding agent which may be used is spent HF alkylation catalyst. This material contains organic fluorides as well as some free hydrogen fluoride.

The calcination associated with the fluoride treatment is carried out at temperatures in the range of about 400 to about 1200° F. for periods in the range of 0.1 to about 20 hours. The treatment is generally carried out in an atmosphere of flowing air or an inert gas. If desired, the fluoriding calcination can be combined with the silica activation. For example, a non-activated silica can be impregnated with an aqueous solution of ammonium acid fluoride and this composite heated at a temperature of about 1000° F. for a time sufficient to produce an active catalyst. After the silica activation and the fluoriding treatment have been completed, the catalyst can also, if desired, be subjected to heating in the presence of other gases such as hydrogen, carbon monoxide, nitrogen, or other inert gases.

The selective polymerization process can be carried out either batchwise or continuously using a fixed catalyst bed, a stirred batch reactor, or other conventional contacting techniques. The process is carried out either in the liquid phase or in vapor phase at temperatures in the range of about 0 to about 500° F. and, preferably, 200 to 350° F. However, liquid phase operation is preferred and pressures which are sufficient to maintain liquid phase are utilized. Pressure in the polymerization zone ranges from about atmospheric to 2000 p.s.i.g., or even higher, but it is preferred to operate at pressures in the range of about 100 to 1000 p.s.i.g. In continuous operation, liquid hourly space velocities in the range of about 0.1 to about 50 v./v./hr. are used. In batch operation, the concentration of catalyst is in the range of about 1 to 40 weight percent of the reaction mixture and the reaction time is in the range of about 1 minute to 20 hours. If desired, inert paraffinic and cycloparaffinic hydrocarbons having up to about 12 carbon atoms per molecule can be employed as diluents in the reaction mixture.

The specific examples presented below illustrate the invention but are not to be construed as unnecessarily limiting the same.

Example I

The invention was demonstrated by passing a hydrocarbon mixture containing both isobutene and normal butenes over a fixed bed of 20–40 mesh fluorided silica. The silica was a conventional catalytic grade silica gel having a surface area of 374 m.$^2$/g. and a pore diameter of 25 A. A 20 g. quantity of this crushed 20–40 mesh material was impregnated with 44 ml. of a solution containing 0.3 g. ammonium bifluoride. The impregnated material was dried and activated for 4 hours in flowing air at 1000° F., resulting in a silica catalyst treated with about 1 percent fluorine by weight based on the silica.

The hydrocarbon mixture contained, in weight percent, propylene 1.9, propane 0.7, isobutene 9.2, n-butenes 77.5, n-butane 0.1, butadiene 0.6, isobutane 10.0, and was passed through the fixed catalyst bed at 500 p.s.i.g. at a liquid hourly space velocity of 8.3 v./v./hr., and at a temperature of 200–255° F. The following data were obtained:

|  | Wt. percent in feed | Wt. percent in effluent | Percent conversion |
| --- | --- | --- | --- |
| Isobutene | 9.2 | 6.7 | 27.2 |
| n-Butenes | 77.5 | 76.9 | 0.8 |

As is seen from the table above, a substantial conversion of isobutene to polymerized products occurred while only a negligible amount of the normal butenes was lost.

*Example 2*

In another set of runs, the same hydrocarbon feed as that described above was passed over a fluorided catalyst under essentially identical conditions except that the conversion temperature was higher and the silica was fluorided to a greater degree. The silica was treated with a quantity of ammonium bifluoride amounting to 5 percent of fluorine by weight based on the silica.

The feed stream was passed over the fixed bed of catalyst at 260° F. at 500 p.s.i.g. and at a liquid hourly space rate of 8.6 v./v./hr. After operating 1 hour at these conditions, the temperature was raised to 350° F. and operation was continued at 500 p.s.i.g. and at a space rate of 8.7 for another hour. The effluent was sampled and analyzed after each hour's operation and the results are shown in the following table:

|  | Wt. percent in feed | 1st hour at 260° F. | | 2nd hour at 350° F. | |
| --- | --- | --- | --- | --- | --- |
|  |  | Wt. percent in effluent | Percent conv. | Wt. percent in effluent | Percent conv. |
| Isobutene | 9.2 | 3.1 | 66 | 6.8 | 26 |
| n-Butenes | 77.5 | 77.9 | −0.5 | 76.7 | 1.0 |

These data also show the polymerization specificity of the process. The data at 260° F. indicate that some isomerization of isobutene to n-butene may have taken place as well.

The polymer is separated from the effluent from either of the above examples by fractional distillation or other conventional procedure.

Certain modifications of the invention will become apparent to those skilled in the art and the illustrative details disclosed are not to be construed as imposing unnecessary limitations on the invention.

I claim:
1. A process for the selective polymerization of isobutene in admixture with n-butenes which comprises contacting a feed containing substantial proportions of isobutene and n-butenes with a catalyst consisting essentially of fluorided silica under polymerizing conditions for isobutene which leave said n-butenes substantially unreacted, and separating the reaction mixture into polymer of isobutene and unreacted n-butenes.

2. The process of claim 1 wherein said recation conditions include a temperature in the range of 0 to 500° F. and a pressure in the range of 0 to 2000 p.s.i.g.

3. The process of claim 1 wherein said reaction conditions include a temperature in the range of 200 to 350° F. and a pressure in the range of 100 to 1000 p.s.i.g.

4. The process of claim 1 wherein said silica contains a fluorine residue in the range of 0.1 to 20 weight percent of the silica.

5. A process for separating isobutene from a feed stream containing isobutene in admixture with a substantial proportion of n-butene which comprises the steps of:
   (1) contacting said feed stream with a fluoride silica catalyst containing an amount of a fluorine residue in the range of 0.1 to 20 weight percent of the silica in a polymerizing zone;
   (2) maintaining isobutene polymerizing conditions in said zone so as to selectively polymerize isobutene, said conditions including a temperature in the range of 0 to 350° F.; and
   (3) separating resulting polymer from the reaction effluent to provide an n-butene stream of substantially lower isobutene content than said feed.

6. The process of claim 5 wherein the polymerization temperature is in the range of 200 to 350° F.

7. The process of claim 6 wherein the pressure in said polymerizing zone is in the range of 100 to 1000 p.s.i.g.

References Cited

UNITED STATES PATENTS

| 2,381,481 | 8/1942 | Anderson | 260—683.15 |
| 2,404,788 | 7/1946 | Burk et al. | 260—683.15 |
| 2,529,010 | 11/1950 | Friedman | 260—683.15 |
| 3,030,433 | 4/1962 | Knight et al. | 260—680 |
| 3,257,473 | 6/1966 | Kovach | 260—677 |

PAUL M. COUGHLAN, Jr., *Primary Examiner.*